United States Patent [19]
Matsuyama et al.

[11] 3,942,636
[45] Mar. 9, 1976

[54] PORTABLE FIRE-HOSE

[75] Inventors: Teruko Matsuyama, Kitakyushu; Tadao Nishida, Ashiya; Toru Uraya, Kobe, all of Japan

[73] Assignee: Kanebo Ltd., Japan

[22] Filed: Mar. 8, 1973

[21] Appl. No.: 339,078

[30] Foreign Application Priority Data
Mar. 14, 1972 Japan.......................... 47-31168[U]
Mar. 30, 1972 Japan.......................... 47-38019[U]

[52] U.S. Cl............. 206/349; 24/16 R; 24/DIG. 18; 150/52 R; 206/525; 206/527; 224/45 R; 224/55
[51] Int. Cl.² B65D 71/00; B65D 63/00; B65D 85/54
[58] Field of Search .......... 206/494, 278, 349, 525, 206/527; 169/17, 30, 35; 248/89–94; 224/45 R, 45.13, 49–58; 150/43, 52 R, 12; 24/16, 17, DIG. 18

[56] References Cited
UNITED STATES PATENTS

| | | | |
|---|---|---|---|
| 677,163 | 6/1901 | Wirt...................................... | 248/90 |
| 1,092,927 | 4/1914 | Majors............................... | 150/52 R |
| 1,446,035 | 2/1923 | Conover ................................ | 150/12 |
| 1,655,822 | 1/1928 | Roth ...................................... | 150/12 |
| 2,023,144 | 12/1935 | Miller .................................... | 150/43 |
| 2,560,205 | 7/1951 | Andren................................. | 206/278 |
| 2,723,431 | 11/1955 | DiRenzo ............................. | 24/16 R |
| 3,279,008 | 10/1966 | Wallach............................... | 24/16 PB |
| 3,372,438 | 3/1968 | Rinecker.............................. | 24/16 R |
| 3,486,200 | 12/1969 | Orenick ............................... | 24/16 PB |
| 3,729,038 | 4/1973 | Ekeson.................................. | 150/52 R |

FOREIGN PATENTS OR APPLICATIONS
185,973  9/1922  United Kingdom................... 150/43

*Primary Examiner*—William Price
*Assistant Examiner*—Allan N. Shoap
*Attorney, Agent, or Firm*—Robert E. Burns; Emmanuel J. Lobato; Bruce L. Adams

[57] ABSTRACT

Portable fire-hose composed of a foldable fire-hose and a wrapping sheet member provided with at least one fastening member secured to the wrapping sheet member so as to tightly wrap the fire-hose in its folded condition. The fire-hose is provided with a metallic joint composed of a male member rigidly mounted on an end of the fire-hose and a female member rigidly mounted on another end of the fire-hose. The fastening member is provided with at least one velvet type fastener.

5 Claims, 7 Drawing Figures

U.S. Patent March 9, 1976 Sheet 1 of 3 3,942,636
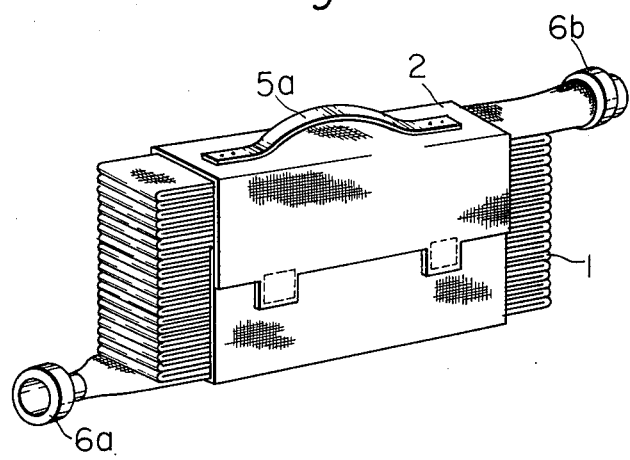
Fig. 1
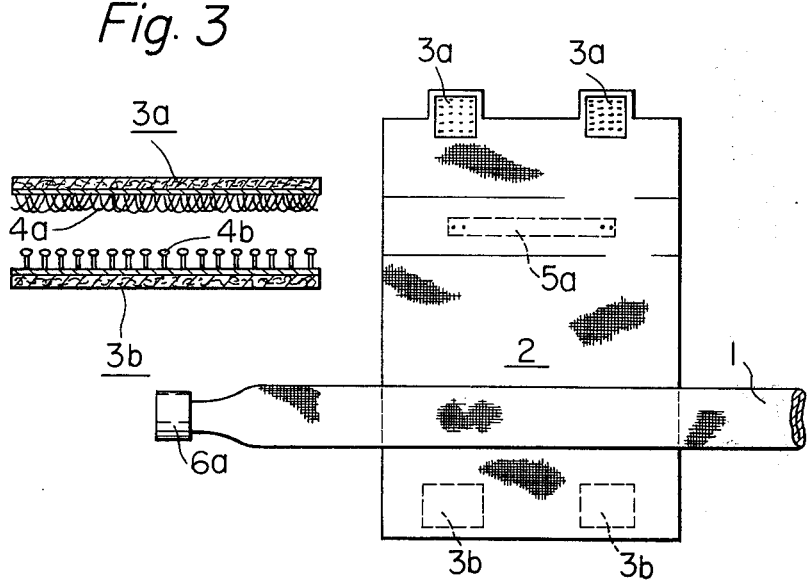
Fig. 2
Fig. 3

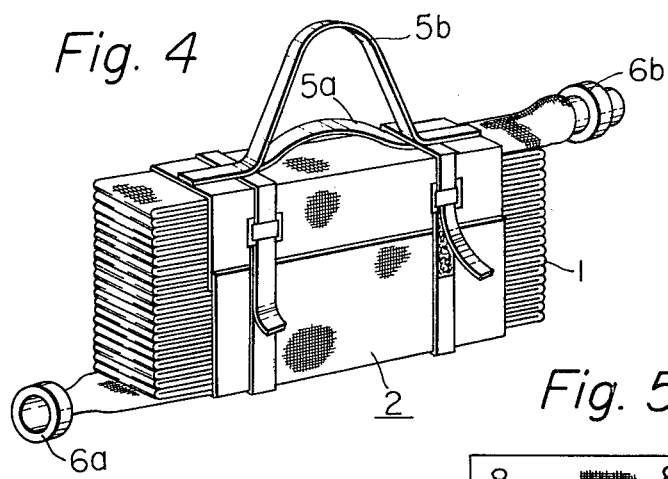
Fig. 4
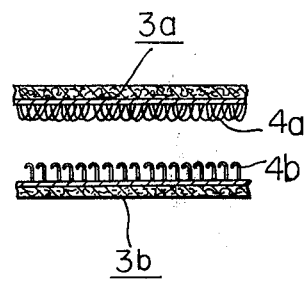
Fig. 6
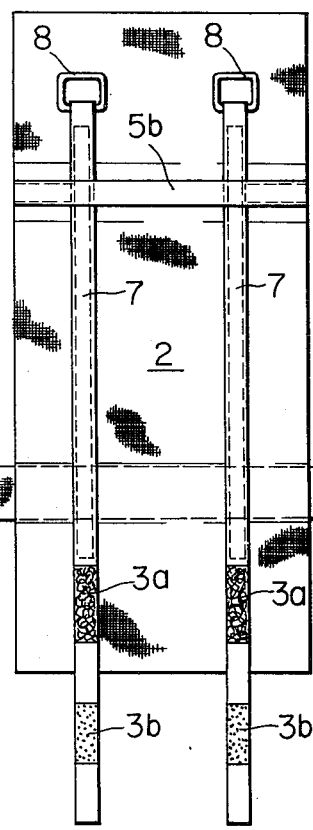
Fig. 5
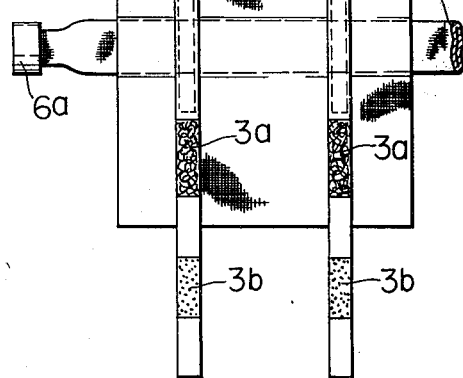

PORTABLE FIRE-HOSE

SUMMARY OF THE INVENTION

The present invention relates to a fire-hose, more particularly a portable fire-hose which is convenient to carry by hand in a compact condition and easily operable when required for use in fire fighting.

It is well known that the conventional fire-hose is wrapped upon a reel or packaged in a reeled condition when it is not in use, and when it is required for use, the reeled fire-hose is carried to the place of the fire and unreeled from the reel. Then sections of unreeled fire-hose are joined to each other or a fire nozzle is connected to one end of the unreeled fire-hose. In the above-mentioned non-use condition, the reeled fire-hose occupies a fairly large space and, consequently it is not very easy or convenient to carry the reeled fire-hose. Moreover, the fire-hose reeling and unreeling operations are troublesome.

The purpose of the present invention is to provide a portable fire-hose which is very easy and convenient to carry to a fire and prepare for fire fighting. In the portable fire-hose according to the present invention, the fire-hose is provided with a wrapping sheet member secured to an end portion thereof so as to tightly wrap the fire-hose in a folded condition. To secure the tight wrapping of the fire-hose in a folded condition, a fastening member, provided with at least one velvet type fastener, is rigidly mounted on the wrapping sheet member. To carry the wrapped fire-hose in the folded condition by the wrapping sheet member, a shoulder band or portable band is secured to the outside surface of the wrapping sheet member.

As the wrapping sheet member is secured to an end portion of the fire-hose, loss of the wrapping sheet member can be prevented when the portable fire-hose of the invention is used for a fire. Moreover, the wrapping of the fire-hose to a folded condition, or the unwrapping operation of the portable fire-hose, can be accomplished very easily and promptly because the wrapping is held tight by utilizing the velvet type fastener. In this invention, the wrapping sheet material and the fastening member are made by non-metallic material such as a plastic material and, therefore, corrosion of the wrapping sheet and fastening member is completely eliminated. Moreover, in the portable fire-hose of the present invention, there are no metallic materials used except for the metallic joint secured to both ends of the fire-hose. Consequently, in the operation of fire fighting, injury to the operator caused by contact with hard metal can be satisfactorily prevented.

Further objects and characteristic features of the portable fire-hose according to the present invention will be hereinafter illustrated in more detail with reference to the accompanying drawings.

BRIEF EXPLANATION OF THE INVENTION

FIG. 1 is a perspective view of a portable fire-hose according to the present invention;

FIG. 2 is a plan view of the portable fire-hose shown in FIG. 1 in opened or unwrapped condition;

FIG. 3 is a schematic cross-sectional side view of a velvet type fastener, used for the portable fire-hose shown in FIG. 1, in free condition;

FIG. 4 is a perspective view of another embodiment of the portable fire-hose according to the present invention;

FIG. 5 is a plan view of the portable fire-hose shown in FIG. 4 in opened or unwrapped condition;

FIG. 6 is a schematic cross-sectional side view of another type of velvet type fastener used for the portable fire-hose shown in FIG. 4.

DETAILED ILLUSTRATION OF THE INVENTION

Figure 7:
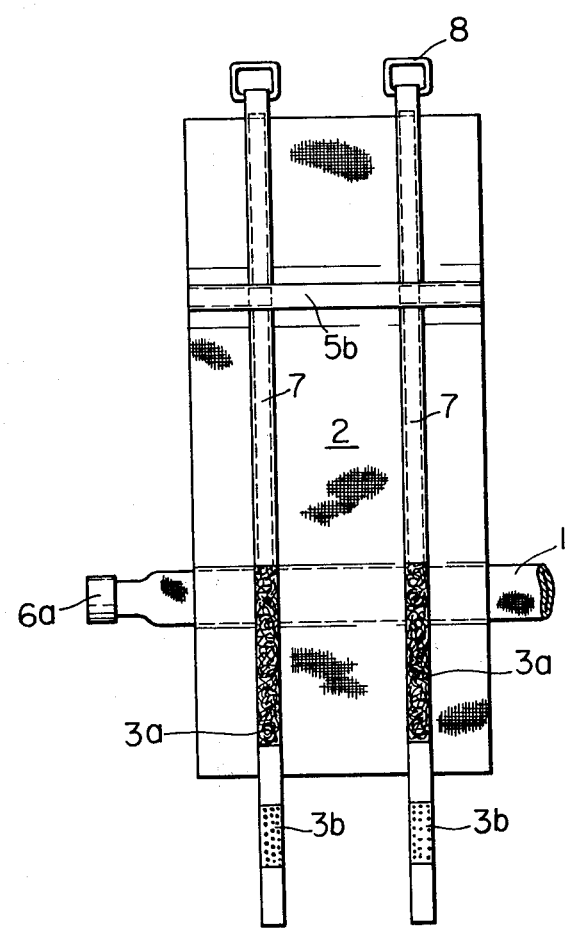
FIG. 7 is a plan view of a modified portable fire-hose in opened or unwrapped condition, according to the present invention.

Referring to FIGS. 1, 2 and 3, an embodiment of a portable fire-hose according to the present invention comprises a fire-hose 1 made of water-proof woven cloth and a wrapping sheet member 2 secured to an end portion of the fire-hose 1. The wrapping sheet member 2 is provided with a pair of velvet type fasteners 3 each velvet type fastener 3 comprising a female element 3a, having a plurality of loops 4a projected from a base sheet thereof, and a male element 3b having a plurality of mushroom shaped projections 4b vertically projected from a base sheet thereof. The base sheet of the female element 3a is secured to an edge portion of the wrapping sheet member 2 on the face side thereof, which is on the side facing the fire-hose 1; while the base sheet of the male element 3b is secured to an opposite edge portion of the wrapping sheet member 2 on the back side thereof at a particular position where the mushroom shaped projections 4b of the male element 3b are capable of engaging with the loops 4a of the female element 3a when the wrapping sheet member 2 is tightly wrapped around the fire-hose 1 when the fire-hose 1 is in a folded condition. In this embodiment, two separate fastening elements are utilized, however, a single fastening element can be used instead of two fastening elements, if the lateral length thereof is sufficiently large to engage the edge portions of the wrapping sheet member tightly. In the above-mentioned illustration, the term "lateral" means a direction along the fire-hose 1. It is important to realize that, in this embodiment, the intervening distance on the wrapping sheet member 1 in opened condition between the above-mentioned male element and female element must be such as to allow the wrapping of the wrapping sheet member about the fire-hose in folded condition. However, as the above-mentioned wrapping is tightly maintained by the engagement of the female element 3a with the male element 3b of the fastening member, there is a certain amount of allowance in the above-mentioned intervening distance. According to this allowance, even if the mass of the fire-hose 1 in folded condition is varied a little according to the swelling of the textile material of the fire-hose, the tightly wrapped condition of the wrapping sheet member 2 can be satisfactorily maintained in the desired condition. This is one of the preferable characteristic features of the present invention. In this embodiment, a portable band 5a is secured to an outside portion of the wrapping sheet member 2 as shown in FIGS. 1 and 2. Therefore, it is very convenient to carry the fire-hose, wrapped by the wrapping sheet member 2 in folded condition, by the portable band 5a. The fire-hose 1 is provided with a joint comprising a male joint member 6a rigidly mounted on an end thereof, and a female joint member 6b rigidly mounted on the other end thereof.

When its use is required, the portable fire-hose 1 shown in FIG. 1 is carried by the portable band 5a to a fire and the wrapping of the sheet member 2, held by the velvet type fastener, is released. Then a plurality of fire-hoses 1 are joined by engaging the male joint or hose coupling of a fire-hose 1 with a female joint or hose coupling of another fire-hose 1, or a fire nozzle (not shown) is joined to one of the joints 6a or 6b of the fire-hose 1. The above-mentioned preparing operations of the portable fire-hose for fire fighting can be carried out very quickly without any trouble, because of the easily detachable engagement of the male element 3b with the female element 3a of the fastening member.

As the above-mentioned fastening member is secured to the wrapping sheet member 2, its loss can be prevented during the fire fighting. Moreover, after completion of the fire fighting, the fire-hose 1 can be easily packaged because of the easy folding operation thereof, the allowable change of the engaging position of the female element 3a with the male element 3b of the fastening member, and the easily accomplished tight engagement of the female element 3a with the male element 3b of the fastening member.

In the above-mentioned embodiment, the fastening member is mainly made of plastic material and metallic materials are not utilized for the present portable fire-hose except for the metallic joints rigidly mounted on the ends of the fire-hose. Consequently, there is not a serious problem of personal injury caused by contact with hard metal during the utilizing operation. Further, even if the above-mentioned wrapping sheet member 2, female element 3a, male element 3b and handle 5 are stamped, these elements or members are still maintained in good condition without any damage caused by inflexibility.

Further, there is no trouble caused by rust of metallic elements, because, in this embodiment, the only metallic material used is for the joints mounted on each end of the hose.

The portable fire-hose 1, according to the present invention shown in FIG. 1, can be tightly folded in compact condition. Consequently, it is very convenient to carry it by the handle 5.

Another preferable embodiment of the portable fire-hose according to the present invention is shown in FIGS. 4, 5 and 6. For the sake of convenience of explanation, component elements having the identical function as the elements of the above-mentioned first embodiment are represented by the same reference numerals and explanations thereof are omitted.

Referring to FIGS. 4, 5 and 6, another embodiment of the portable fire-hose according to the present invention is provided with the wrapping sheet member 2 again secured to an end portion of the fire-hose 1. A pair of fastening belts 7 are partly secured to the outside surface of the wrapping sheet member 2 in parallel condition as shown in FIG. 5. For the purpose of fastening the wrapping sheet member 2, when the fire-hose 1 in folded condition is wrapped by the sheet member 2, these belts are arranged at right angles to the longitudinal axis of the fire-hose 1. Each fastening belt 7 is provided with a looped guide member 8 held by a free end thereof. A velvet type fastener is secured to the other free end portion of the fastening belt 7 in such a way that either the female element 3a or male element 3b (hereinafter referred to as a first element) of said velvet type fastener is secured to the outside surface of the belt 7 at a position inside from an edge of the wrapping sheet member 2; while the other element 3b or 3a (hereinafter referred to as a second element) of the velvet type fastener is secured to the outside surface of the belt 7 at a position outside the position of the first element. The relative disposition of the female element 3a and the male element 3b on the belt 7 is selected so as to permit the following operation. When the fire-hose in folded condition is wrapped by the wrapping sheet member 2, the free end of the belt 7 is inserted into the looped guide 8 and turned back; next, the free end of the belt 7 is pulled (downward in FIG. 4) so as to fasten the belt 7 by engaging both elements of the velvet type fastener. In FIG. 4 the belt 7 on the left shows a condition of engagement of both elements while the belt 7 on the right shows a condition just before the above-mentioned engagement of the male element 3b with the female element 3a of the velvet type fastener. When the above-mentioned fastening belt is secured to the wrapping sheet member 2, the operation of fastening the fire-hose 1 in folded condition can be carried out very easily. In addition, when it is necessary to open the wrapping sheet member 2, the free end of the belt 7 is pulled outward, and the engagement of the female member 3a with the male member 3b of the velvet type fastener secured thereon can be easily released. In this embodiment, the male element 3b of the velvet type fastener is the conventional hook type, as shown in FIG. 6.

For convenience in carrying this portable fire-hose 1, a shoulder band 5b is secured to an outside surface of the wrapping sheet member 2. In this embodiment, the shoulder band 5b is mounted on the wrapping sheet member 2 so as to be positioned outside the portable band 5a. It has been confirmed that the above-mentioned second embodiment of the portable fire-hose has the same function as the first embodiment shown in FIGS. 1 and 2.

In the modified embodiment the portable fire-hose shown in FIG. 7, the looped guide member 8 is mounted on an end of the belt 7 which extends outside from an edge of the wrapping sheet member 2. However, the quite similar function as that of the second embodiment shown in FIGS. 4, 5 can be expected.

What is claimed is:

1. A portable fire hose comprising, in combination: a foldable textile fire hose having at each end thereof a hose coupling and foldable during nonuse into a folded condition; a flexible wrapping sheet member secured to an end portion of said fire hose and wrappable completely around said fire hose when in said folded condition such that said wrapping sheet member encircles a major portion of the folded hose with only the fold portions and hose couplings remaining unwrapped; fastening means for releasably fastening said wrapping sheet member around the folded fire hose to thereby maintain said fire hose in said folded condition; said fastening means comprising at least one velvet type fastner comprising a female element provided with a plurality of loops and a male element provided with a plurality of projections releasably engageable with said loops, said female element being secured to one end portion of said wrapping sheet member and said male element being secured to the other end portion of said wrapping sheet member such that said projections releasably engage with said loops to fasten said wrapping sheet member around the folded fire hose to thereby maintain said fire hose in said folded condition; and a handle secured to said wrapping sheet member to enable hand-carrying of the folded and wrapped fire hose.

2. A portable fire hose according to claim 1; wherein said male and female elements are secured on opposite side faces of said wrapping sheet member.

3. A portable fire hose comprising, in combination: a foldable textile fire hose having at each end thereof a hose coupling and foldable during nonuse into a folded condition; a flexible wrapping sheet member secured to an end portion of said fire hose and wrappable completely around said fire hose when in said folded condition such that said wrapping sheet member encircles a major portion of the fire hose with only the fold portions and hose couplings remaining unwrapped; fastening means for releasably fastening said wrapping sheet member around the folded fire hose to thereby maintain said fire hose in said folded condition; said fastening means comprising at least one fastening belt secured to the outside face of said wrapping sheet member and having a length at least sufficient to extend around said wrapping sheet member when the latter is completely wrapped around the folded fire hose, and a velvet type fastener composed of a female element provided with a plurality of loops and a male element provided with a plurality of projections releasably engageable with said loops, said female and male elements being secured to said fastening belt at locations relative to one another to enable said projections to releasably engage with said loops when said fastening belt extends around said wrapping sheet member to thereby releasably fasten said wrapping sheet member around the folded hose; and a handle secured to said wrapping sheet member to enable hand-carrying of the folded and wrapped fire hose.

4. A portable fire hose according to claim 3; wherein only one end of said fastening belt extends outward beyond the edge of said wrapping sheet member, a looped guide member connected to the other end of said fastening belt which does not extend beyond the edge of said wrapping sheet member, one of said female and male elements being secured to said fastening belt at said one end thereof but at a position inside from said edge of said wrapping sheet member and the other of said female and male elements being secured to the extended portion of said fastening belt at locations relative to one another to enable said projections to releasably engage with said loops when said wrapping sheet member wraps said fire hose in said folded condition and said extended portion of said fastening belt provided with said other element passes through said looped guide member and is pressed against said one element positioned inside from said edge of said wrapping sheet member.

5. A portable fire hose according to claim 3; wherein both ends of said fastening belt extend outward beyond the edges of said wrapping sheet member, a looped guide member connected to one end of said fastening belt, one of said female and male elements being secured to the other end portion of said fastening belt at a position inside from the edge of said wrapping sheet member and the other of said female and male elements being secured to the extended portion of said other end of said fastening belt at locations relative to one another to enable said projections to releasably engage with said loops when said wrapping sheet member wraps said fire hose in said folded condition and the extended portion of said other end of said fastening belt provided with said other element passes through said looped guide member and is pressed against said one element positioned inside from said edge of said wrapping sheet member.

* * * * *